J. KERMATH.
CENTER.
APPLICATION FILED MAY 24, 1919.

1,336,843.

Patented Apr. 13, 1920.

Inventor
James Kermath,
By Ratcliff & Ratcliff
Attorneys

UNITED STATES PATENT OFFICE.

JAMES KERMATH, OF DETROIT, MICHIGAN.

CENTER.

1,336,843.  Specification of Letters Patent.  Patented Apr. 13, 1920.

Application filed May 24, 1919. Serial No. 299,452.

*To all whom it may concern:*

Be it known that I, JAMES KERMATH, a citizen of the United States of America, residing at Detroit, in the county of Wayne and State of Michigan, have invented certain new and useful Improvements in Centers, of which the following is a specification, reference being had therein to the accompanying drawings.

This invention relates to centers for lathes and work holders, and has special reference to that type of centers used in connection with the head and tail stocks of a lathe for centering or holding a piece of work so that operations may be performed thereon. The centers now in use are made of high speed steel and the bodies or spindles of the centers require considerable material, which is expensive and which is not in reality subjected to wear and tear, so it is possible to make the center bodies of cold rolled steel or other inexpensive material compared to the high speed steel centers. This is what my invention aims to accomplish and it is obvious that by making a center body of a different material from the center, *per se,* I not only save material and expense, but permit of centers being easily produced and quite a number used before the body becomes useless.

In providing a center body with a detachable center, it is also possible to use the center body as a holder for a drill or other tool, and provision is made so that a center or a tool may be quickly removed from its body or holder.

My invention will be better understood when reference is had to the drawing, wherein—

Figure 1:
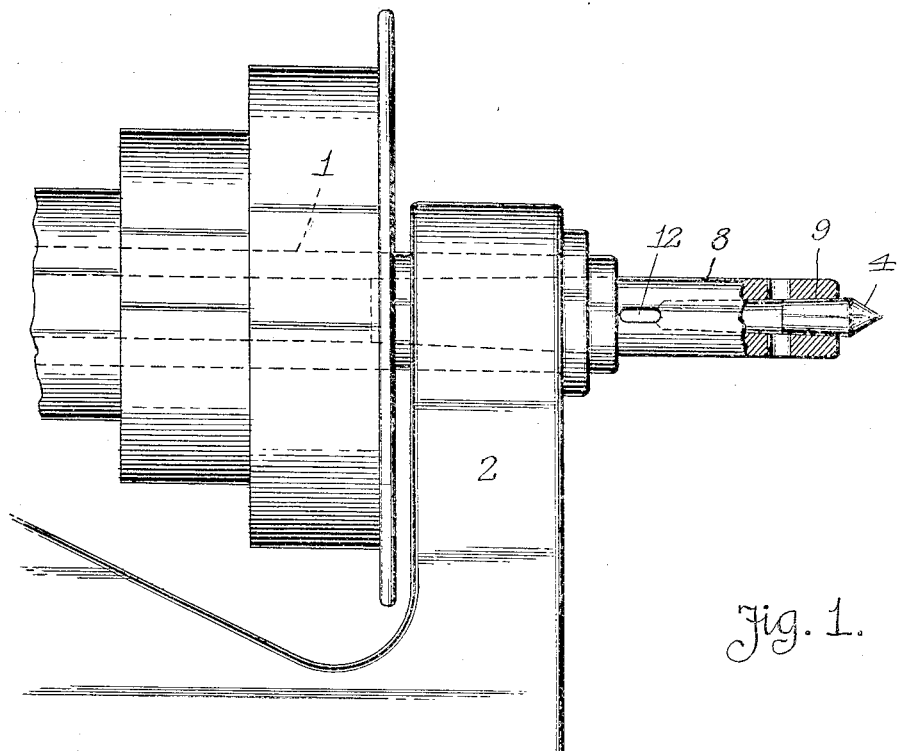
Figure 1 is a side elevation of a portion of the head stock of a lathe provided with a center body in accordance with my invention.
Figure 2:
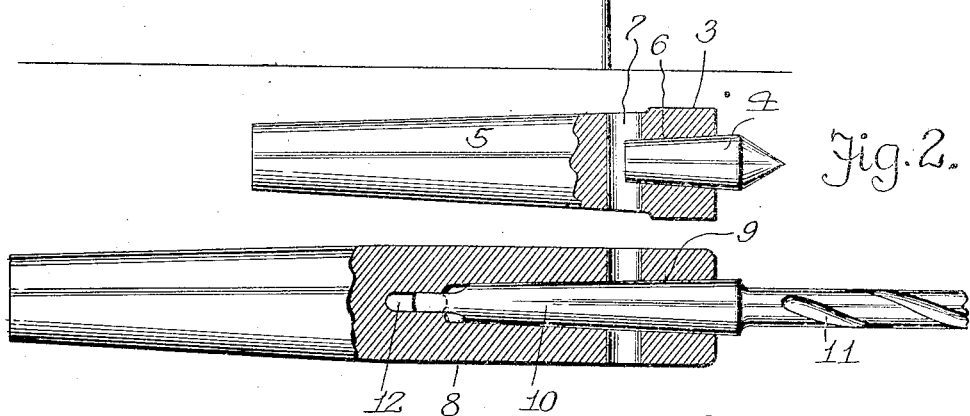
Fig. 2 is a side elevation of a center body provided with a center.

In the drawing, the reference numeral 1 denotes, by the way of an example, a tubular or hollow lathe spindle which extends into the head stock 2 of a lathe and ordinarily receives the body or inner end of a center so that one end of a piece of work may be held at the head stock of the lathe.

3 denotes a center body having a detachable center 4, the center body being made of cold rolled steel or of less expensive material than the center 4, which is made of high speed steel. The center body 3 has the inner end thereof tapered, as at 5, so as to extend into the lathe spindle 1, and the outer end of the center body is cylindrical and provided with a longitudinal opening 6 communicating with a transverse opening 7. The opening 6 tapers inwardly from the outer end of the body and has its small end communicating with the transverse opening 7, so that the inner tapered end of the center 4 may protrude into the opening 7 and permit of a wedge or taper instrument or tool being inserted in the opening 7 to unseat the inner end of the center 4.

Figure 3:
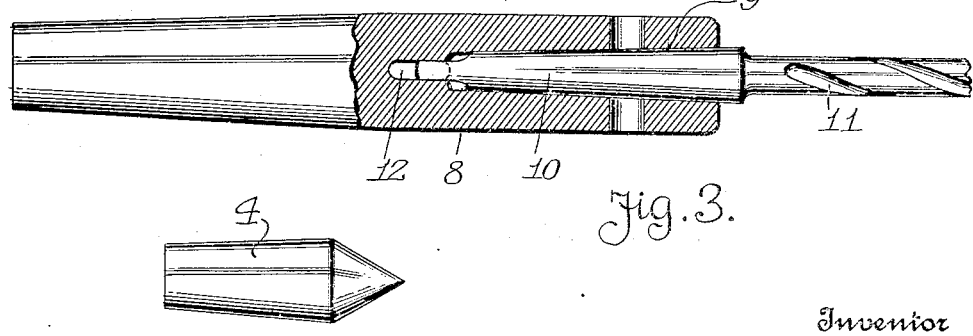
Fig. 3 is a side elevation of a combined tool and center body, partly broken away and partly in section.
Figure 4:
Fig. 4 is a side elevation of a center.

As shown in Fig. 3, a body 8 may be provided of greater length than the body 3 and a longitudinal opening 9 formed in the body of greater length than the opening 6, so that the opening 9 may accommodate the shank 10 of a drill 11. The inner end of the opening 9 terminates in a transverse opening 12 that receives the tang of the drill shank and permits of the drill shank being forced from the opening 9 when desirable to remove the drill. With the drill removed, a center may be placed in the opening 9, and in either instance the body will outlast several centers or tools and materially reduce the expense of maintenance in connection with lathes and other metal working machines.

As will be understood the holding element 3 and the center element 4 provide an assembly formation to be used in substitution for the one-piece center heretofore universally used, the holding element being formed to provide an efficient substitute for the tapered rear end portion of the one-piece structure, the center element serving the function of the forward end of such structure. Instead, however, of being formed of one piece of metal—the characteristics of which must be determined by the requirements of the centering point itself—the two elements are formed of different grades of steel, thus enabling the portion which is subject to wear and breakage, to be readily renewed at comparatively small expense.

The advantages of the present structure will be clear by a brief statement of the requirements which must be met when the commercial type of one-piece structure is employed.

The requirements of service practically limit the possible variations in the bearing surface from the exact axis to less than .002 inch; greater variations so affect the holding of the work to the true center as to render the center useless for service. The bearing point must be sufficiently tight onto the work as to prevent any lost motion. These two factors are absolute requirements which must be met in all successful centers. One additional factor is the possibility of the workman attempting a too deep cut on the work with the setting up of conditions which break off the bearing point of the center.

Where a one-piece center is employed—generally of a lower grade steel by reason of the high cost of the highest grade steel, especially where the center is of any material size—the wear resulting from the friction of the work rotating on the stationary center renders the center unserviceable in a short time—possibly a few hours. This necessitates re-pointing by a grinding operation, thus necessitating removal of the center from the lathe. To do this it is necessary to insert a bar in the opposite end of the chuck from the end carrying the center, and driving the center out. No provision being made to catch the center it falls on to the lathe with the probability of forming a bur on the holding end. A new point is produced by grinding, and the center placed back—but with the bur active on the complemental surface of the chuck. This operation is repeated when necessary, and the repeated removals and insertions—through the damaging of the center surface—produces a condition where the center must be driven into place, after which the chuck becomes more or less unserviceable due to deformation. Should the requirement for removal be due to breakage of the centering point, it becomes necessary to first employ a turning operation to remove sufficient metal to enable the grinding to finish it, and to permit this it is necessary to remove the temper, provide the turning operation—with the rear tapered surface gripped by the holding element to permit turning—re-temper the stock and then grind the finished surface. This operation presents another source of difficulty in that there is liability to tend to deform the tapered rear end thus affecting the relation between the chuck socket and the center, practically requiring the center to be driven into place and deforming the socket; this has led to the practice of marking the socket and center before removal so as to permit restoration at the same point. It is not feasible to attempt to restore a new surface on the tapered rear end since that affects the position of the center relative to the chuck. Such operations are limited in number since the reheating and tempering gradually render the steel of lower quality, making the mass of steel useless except as scrap.

These conditions are due primarily because of the requirement that the center must be bodily removed from the lathe to permit re-pointing, and the necessity for removing the entire center to permit this action to take place. And the same difficulties are present where the center is of two or more parts so arranged as to require removal of all of the parts from the lathe in order to remove the part to be re-pointed. For instance, where the center element is positioned within a holding element and the latter is required to be removed with the center element, the same possibilities of damaging the holding element taper is present, since it must be driven out and, like the one-piece structure,—drops on to the lathe or floor with the tendency to bur; it is then necessary to remove the center element and this requires placing the holding element within a vise and unless brasses are used, the clamping action increases the bur formation. As a result, the surface of the holding element carries the same characteristics as that of the one-piece element and becomes useless for the purpose designed for it after comparatively short service, since it is necessary to remove it each time the center is to be re-pointed.

Where the center of the present invention is employed, the holding element is retained in its position in the chuck until removal is necessary for purposes of using the chuck for other purposes. The center element only is removed and the direction of application of pressure—where required—in removing the center-element is not such as to loosen the holding element; it consequently remains undamaged and the life of the chuck socket is not affected. The center element is not only of increased hardness—being small it can be produced from a higher grade steel without increasing the cost over the one-piece construction—but being small its weight will not provide the burring action on the tapered surface even if permitted to drop when driven out, the higher grade steel also aiding in producing this result. By maintaining a reserve of a few center elements, no time is lost by the operator in exchanging one for another, permitting the removed element to be repointed at leisure or by a workman having the re-pointing as a duty. There is less capital investment required for centers, since the reserves are mainly of the center element, and when of no further service—by being re-pointed until the point has receded into the holding element a distance where insufficient exposure is had,—the loss due to scrapping is comparatively small.

While in the drawing there is illustrated the preferred embodiments of my invention, it is to be understood that the structural elements are susceptible to the variations and modifications which fall within the scope of the appended claim.

What I claim is:—

A lathe center assembly comprising a center element and a holding element, said holding element having a tapered exterior adapted to fit the usual center-receiving opening of a lathe, said holding element also having its opposite end formed with an axial bore tapering inwardly and an opening extending diametrically and intersecting the bore at approximately right angles to the bore axis, said center element having its advance end tapered to provide the centering point and the rear of its body portion tapered rearwardly in correspondence with the taper of said bore, the length of the tapered body being sufficient to locate the rear end of the element exposed within the dimensions of said opening, whereby the center element may be removed from the holding element while the latter is in position on the lathe by the operation of a tool insertible through the opening.

In testimony whereof I affix my signature in the presence of two witnesses.

JAMES KERMATH.

Witnesses:
  KARL H. BUTLER,
  ANNA M. DORR.